(12) United States Patent
Xing

(10) Patent No.: US 10,334,561 B2
(45) Date of Patent: Jun. 25, 2019

(54) COLLABORATIVE BROADCASTING AND BI-DIRECTIONAL NETWORK TRANSMISSION

(71) Applicant: CMMB Vision USA Inc., Central Hong Kong (HK)

(72) Inventor: Guanbin Xing, Central Hong Kong (HK)

(73) Assignee: CMMB Vision USA Inc., Central Hong Kong (HK)

( * ) Notice: Subject to any disclaimer, the term of this patent is extended or adjusted under 35 U.S.C. 154(b) by 84 days.

(21) Appl. No.: 15/202,192

(22) Filed: Jul. 5, 2016

(65) Prior Publication Data

US 2018/0014277 A1 Jan. 11, 2018

(51) Int. Cl.
*H04W 76/10* (2018.01)
*H04W 72/00* (2009.01)
*H04W 4/06* (2009.01)
*H04W 84/04* (2009.01)

(52) U.S. Cl.
CPC ........... *H04W 72/005* (2013.01); *H04W 4/06* (2013.01); *H04W 76/10* (2018.02); *H04W 84/042* (2013.01)

(58) Field of Classification Search
CPC ..... H04W 72/005; H04W 4/06; H04W 76/02; H04W 76/04; H04B 7/00; H04L 1/1893
See application file for complete search history.

(56) References Cited

U.S. PATENT DOCUMENTS 5,357,505 A * 10/1994 Tsumura ............... H04M 11/06
370/468
2010/0159822 A1 6/2010 Lim et al.

2011/0314506 A1* 12/2011 Agarwal ............... H04L 1/1607
725/62
2013/0229979 A1* 9/2013 Liu ........................ H04L 1/1893
370/328
2013/0286813 A1* 10/2013 Liu ......................... H04W 4/06
370/216
2013/0298170 A1* 11/2013 ElArabawy ....... H04W 28/0231
725/62

FOREIGN PATENT DOCUMENTS

| CN | 101222302 A | 7/2008 |
| CN | 103873216 A | 6/2014 |
| CN | 104579602 A | 4/2015 |

OTHER PUBLICATIONS

The International Search Report and Written Opinion dated Sep. 21, 2017, in connection with corresponding International application No. PCT/IB2017/000813 (8 pgs.).

* cited by examiner

*Primary Examiner* — Lakeram Jangbahadur
(74) *Attorney, Agent, or Firm* — Maier & Maier, PLLC

(57) ABSTRACT

A system and method for collaborative broadcasting and bi-directional network transmission. Such a system may comprise a broadcast transmission source that uses a one-to-many broadcasting method, a bi-directional network that uses a one-to-one broadcasting method, and a receiver apparatus configured to receive broadcasts from the broadcast transmission source and communicate with the bi-directional network. When the receiver apparatus receives a broadcast from the broadcast transmission source, and when the broadcast is partially damaged or missing, the receiver apparatus is configured to communicate with the bi-directional network and request the damaged or missing data.

14 Claims, 3 Drawing Sheets

```
┌─────────────────────────────────────┐
│ Program segmented into pieces and each │
│      segment assigned identifier        │
│                 102                     │
└─────────────────────────────────────┘
                  ↓
┌─────────────────────────────────────┐
│   Complete program segments are         │
│      broadcasted to receivers           │
│                 104                     │
└─────────────────────────────────────┘
                  ↓
┌─────────────────────────────────────┐
│  Receivers detect problem segments and  │
│      send feedback to network           │
│                 106                     │
└─────────────────────────────────────┘
                  ↓
┌─────────────────────────────────────┐
│   Lost segments re-transmitted via      │
│        interactive channel              │
│                 108                     │
└─────────────────────────────────────┘
                  ↓
┌─────────────────────────────────────┐
│  Receivers re-assemble segments and     │
│          deliver service                │
│                 110                     │
└─────────────────────────────────────┘
```

Fig. 1

COLLABORATIVE BROADCASTING AND BI-DIRECTIONAL NETWORK TRANSMISSION

BACKGROUND

There are two major means of transmitting content that currently see widespread use. The first of these might be called "traditional broadcasting," and includes forms of broadcasting like "high-power/high-tower" terrestrial broadcasting and satellite broadcasting. The second of these, bi-directional network communication, includes 3G and 4G wireless telecommunications networks and serves as the basis for the mobile internet. Each of these has certain advantages and disadvantages for transmitting content.

Traditional broadcasting generally has the advantages of low cost and broad coverage. Traditional broadcasting offers "one-to-many" broadcasting with almost zero marginal cost as new devices are added. Typically, traditional broadcasting is the best or only way to get broad coverage geographically, and is almost always the best way to cover highways, rural areas, and other remote areas. Traditional broadcasting typically is most efficient in delivering live, common, and popular contents; this is especially true when combined with push services, such that content can be stored at the time it is broadcasted and played later.

However, traditional broadcasting also suffers from a number of downsides that limit its performance in urban and other environments. Satellite broadcasting is constrained in line-of-sight (LOS) conditions, and while this typically offers coverage to a large area, it can often be heavily constrained by terrain features. Coverage is typically bad in an urban environment, meaning that a broadcaster has to rely heavily on a ground repeater network, which can be expensive to build and maintain. Traditional broadcast is also usually designed as worst-case bounded and usually have to use low-order coding and modulation, leading to poor system efficiency. Traditional broadcasting is also typically not suited for interactive behavior and customized content; what satellite internet services exist often have very high latencies and very low upload speeds.

Bi-directional network communication has several advantages of its own. It typically has good coverage in urban and developed areas, and its infrastructure is improving. It also offers much better performance for delivering interactive and customized content.

However, it also suffers from certain notable disadvantages. In particular, it is much more costly to operate, assuming a large user base; while traditional broadcasting has close to zero marginal cost because it transmits the same content to many different users at one time, bi-directional network communication operates on a one-to-one basis: the same content being transmitted to each user many times, and as a result the cost increases linearly with the number of users. Also, the bi-directional network's coverage is generally not good in rural and remote areas because of a lack of potential users.

SUMMARY

According to at least one exemplary embodiment, a method and system for collaborative broadcasting and bi-directional network transmission may be described. Such a system may combine the advantages of traditional broadcasting and bi-directional network communication, while mitigating the disadvantages of each.

Such a system for collaborative broadcasting and bi-directional network transmission may include: a broadcast transmission source that broadcasts a signal carrying program data in the form of a plurality of data segments using one-to-many broadcasting; a bi-directional network that transmits and receives a data using one-to-one transmission; a receiver that receives the signal broadcasted from the broadcast transmission source, analyzes the signal to generate a feedback information, and transmits the feedback information to the bi-directional network if the receiver detects an erroneous signal; wherein the bi-directional network receives the feedback information, and further transmits a recovery data to the receiver; and wherein the receiver recovers the erroneous signal using the recovery data.

Also, the receiver can include: a processor operationally linked to a memory, where the processor stores the signal received from the broadcast transmission source in the memory, analyzes the signal to generate the feedback information, and recovers the erroneous signal using the recovery data from the bi-directional network; and a transmitter operationally linked to the processor, where the transmitter transmits the feedback information as instructed by the processor to the bi-directional network.

Furthermore, the receiver and at least one paired device are in communication via a near-area connection, and the paired device includes a switching device for selecting to communicate with the receiver, the broadcast transmission source, or the bi-directional network. The broadcast transmission source and the bi-directional network are connected to a multimedia service platform. The multimedia service platform receives the feedback information via the bi-directional network, determines the recovery data considering the feedback information, and transmits the recovery data to the receiver via the bi-directional network or the broadcast transmission source.

In another exemplary embodiment, a method for collaborative broadcasting and bi-directional network transmission may be described. Such a method may include: determining, on a multimedia service platform, program data to be broadcasted; segmenting, on the multimedia service platform, the program data into a plurality of segments; assigning, on the multimedia service platform, an identifier to each of the plurality of segments; broadcasting, using a broadcast transmission source, the plurality of segments to at least one receiver; analyzing, on the receiver, the segment to generate a feedback information of erroneous segments; transmitting, using a bi-directional network, the feedback information to the multimedia service platform; determining, on the multimedia service platform, a recovery data using the feedback information; transmitting, using the bi-directional network, the recovery data to the receiver; and recovering, on the receiver, the erroneous segment using the recovery data.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an exemplary embodiment of a method for collaborative broadcasting and bi-directional network transmission.

DETAILED DESCRIPTION

Figure 2:
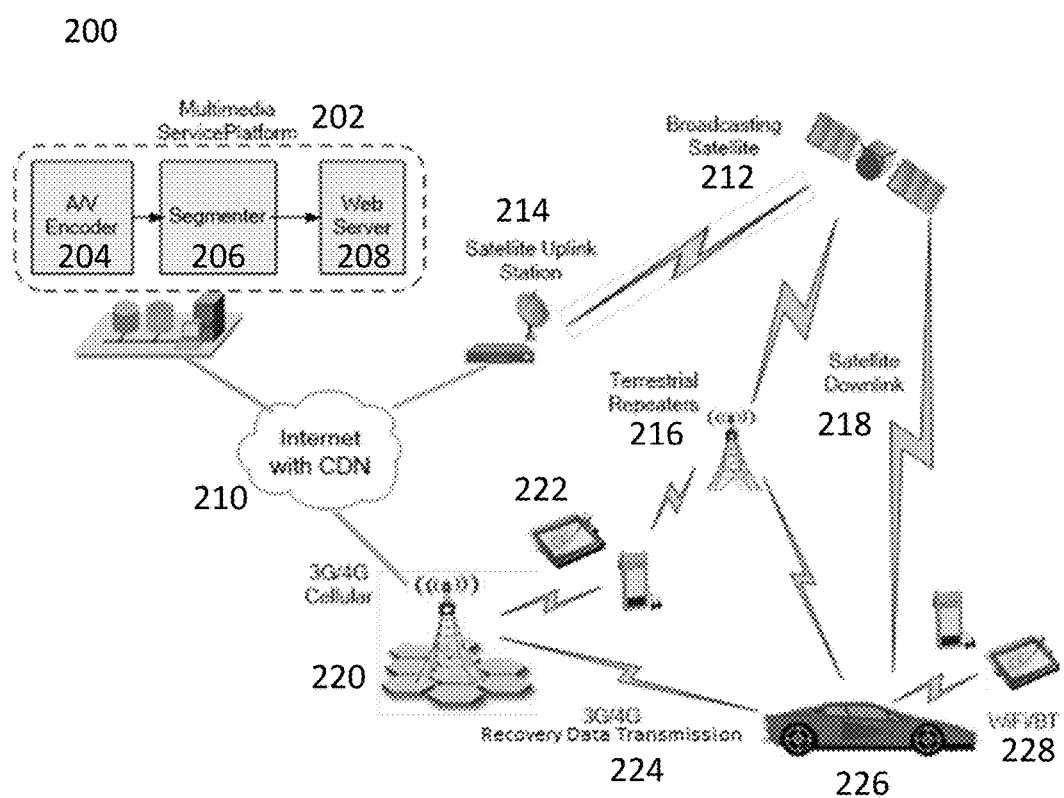
FIG. 2 is an exemplary embodiment of a system for collaborative broadcasting and bi-directional network transmission.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

According to an exemplary embodiment, and referring to the Figures generally, a method of network communications combining the advantages of traditional broadcasting (or "one-to-many" broadcasting) and bi-directional network communication (or "one-to-one transmission") may be provided. According to one exemplary embodiment, traditional broadcasting and bi-directional network communication may be combined in a complementary fashion by transmitting the same content on both a traditional broadcasting network and a bi-directional network. A receiver may then be configured to select the better signal. This may allow a receiver to continue to operate despite a lapse in the coverage of either the traditional broadcasting network or the bi-directional network. Such a method may be most practical under circumstances where there is similar or identical content being transmitted to many different users at any given time, for example when many users are watching the same video stream such as a televised sporting event. However, such a method of combining a traditional broadcasting network and a bi-directional network may be further refined.

Still referring to the Figures generally, it can be noted that a reason why a broadcasting network may suffer from low efficiency may be because the coverage of the network is constrained by the "worst-case" receivers within the network's coverage, wherein the "worst-case" receivers are the receivers least able to receive and decode transmissions from the broadcasting network. In order to ensure that the "worst-case" receivers can receive and decode transmissions, the broadcasting network must either increase its transmitting power, or must reduce coding and modulation for highest robustness, up to a desired coverage level (such as 99% or another desired coverage level), each of which may result in lowered efficiency.

Much of this reduced efficiency may be unnecessary. For example, it may be unnecessary to broadcast all transmissions at a heightened transmitting power or having reduced coding and modulation if only parts of the transmissions are being lost or incorrectly received. A broadcasting network may be able to obtain higher efficiency if it can identify which parts of the transmissions are being lost or incorrectly received. As such, if the receivers can feedback which part of the transmission is not being correctly received, the network can re-transmit that portion of the transmission to the relevant receivers. This may include, for example, identifying bad packets and only re-transmitting those packets that were actually lost. This means that, even though the re-transmission may cost some traffic and thereby reduce efficiency, the broadcasting threshold is lifted by allowing some errors, and the overall system efficiency can be improved by balancing the cost between traditional broadcasting and bi-directional network communication.

Turning now to exemplary FIG. 1, this figure displays an exemplary embodiment of a method for collaborative broadcasting and bi-directional network transmission 100. Such a method may first require that a given transmission, such as a program to be transmitted, be segmented into pieces and each of the segment is assigned a corresponding identifier such as a sequence number 102. The complete segments may then be broadcasted to all or substantially all of the receivers served by the broadcasting source, such as all of the receivers in a given area 104. The broadcasting source may be, for example, a satellite, or may be any other high-power/high-tower broadcasting system or any other traditional broadcasting system, as desired; broadcasting source may be referred to generally as a "satellite." Receivers may then detect missing, erroneous, or otherwise flawed segments in the received transmission, and may feedback the lost segment information to the bi-directional network 106. This feedback may be by an interactive channel such as 3G or 4G cellular network communication, mobile internet, or by another channel, as desired. The recovery data may then be transmitted to the applicable receivers 108, for example via an interactive channel such as a 3G or 4G cellular network. Segments may then be recovered based on the received recovery data by the receiver in order to deliver the service 110.

In an exemplary embodiment, the segments that were erroneously received may contain partial information that can be utilized. Thus, the receiver may detect erroneous bits in a received transmission, and may feedback the information of the erroneous bits to the bi-directional network. The bi-directional network may then transmit recovery data including additional redundant bits, rather than the whole segment. The receiver may then combine the redundant bits together with the useful parts of the previous erroneous segment. In another exemplary embodiment, the receiver may feedback only how many segments and/or bits were missing rather than feedback exactly which segments and/or bits were being erroneous. The bi-directional network may then transmit recovery data including the proper amount of additional segments and/or bits to help the receiver recover the whole segments. Also, according to another exemplary embodiment, the receiver may include a processor, a memory and a transmitter. The processor may store the segments in the memory, analyze the segments to detect the erroneous segments and/or the bits to generate the feedback information of the erroneous segments and/or the bits. If there are erroneous segments and/or bits, the processor may instruct the transmitter to transmit the feedback information. The processor in the receiver also may recover the erroneous segments and/or the bits using the recovery data.

Also, in another exemplary embodiment, the recovery data may be transmitted, or may instead be transmitted, via a traditional broadcast network. This may be done, for example, if large numbers of receivers report detecting identical missing, erroneous, or otherwise flawed segments and/or bits in the received transmission, for example due to momentary interference.

Turning now to exemplary FIG. 2, this figure displays an exemplary embodiment of a system for collaborative broadcasting and bi-directional network transmission 200 that may employ such a communications technique. According to such an exemplary embodiment, a multimedia service platform 202, including for example an A/V encoder 204, a segmenter 206, and a Web server 208, may contain or access data to be transmitted. The multimedia service platform 202 may transmit, such as via an internet content delivery network (CDN) 210, segments of encoded data to be transmitted to one or more receivers. Transmission may take place via traditional broadcasting, such as via a broadcasting satellite 212, and/or may take place via bi-directional network communication, such as via a 3G/4G cellular network 220. Configuring a broadcasting satellite 212 may require that the data be first transmitted to a satellite uplink station 214 configured to communicate with the broadcasting satellite 212. Broadcasts from the broadcasting satellite 212 may be direct, via a satellite downlink 218, and/or may be indirect, for example through one or more terrestrial repeaters 216, as desired.

According to an exemplary embodiment, instead of being a singular device, multimedia service platform 202 may be two or more devices with identical or overlapping content. For example, one device may fill the role of a multimedia service platform 202 at a satellite uplink location, and another device may fill the role of a multimedia service platform 202 at a cell tower location. According to an exemplary embodiment, program data may be pre-segmented, or may use identical segmenting algorithms, or as desired. Additionally, it may be appreciated that program data may be any of a variety of data or content, for example audio data, video data, combined audio and video data, or any other type of data or combination of data, as desired. Also, according to another exemplary embodiment, the multimedia service platform 202 may receive the feedback information of erroneous segments and/or bits via the bi-directional network from the receiver. Then the multimedia service platform may determine the recovery data of the segments or redundant bits considering the feedback information, and transmits the recovery data, via the bi-directional network or the broadcast transmission source, to help the receiver to recover the erroneous segments and/or bits.

3G/4G cellular network 220 may be in communication with the receiver apparatus 226, such that the receiver apparatus 226 can request and obtain recovery data 224 of any data segments and/or bits that are missing, erroneous, or otherwise flawed. The receiver apparatus 226 may then provide a data connection to other devices, such as via a near-area wireless connection like WiFi or BlueTooth (BT) 228, or via another form of data connection, as desired. Both the 3G/4G cellular network 220 and the broadcasting satellite 212 may be used to provide services to other receiver apparatuses 222 such as smartphones, tablet devices, or other kind of devices, as desired as well; for example, other receiver apparatuses 222 may be able to access the 3G or 4G cellular network 220 and may be able to access the broadcasting satellite 212 through a terrestrial repeater 216 by the other receiver apparatus' hardware upgrade, such as integrating a satellite module, or other upgrade method, as desired. Receiver apparatus 226 may be mounted in another device, such as in an automobile, as desired.

According to an exemplary embodiment, the receiver apparatus 226 may be mounted in an automobile, and may provide for satellite vehicular reception. Reception of data transmissions for the receiver apparatus 226 and/or the other receiver apparatus 222 may be based on a standard internet protocol, such as the HTTP Live Streaming (HLS) protocol, or based on another protocol, as desired. Receiver apparatus 226 and/or the other receiver apparatus 222 may be configured to combine the segments and/or bits from a traditional broadcasting link, such as a satellite downlink 218, and a bi-directional network, such as the 3G/4G cellular network 220. Receiver apparatus 226 may be configured to communicate a wireless signal such as a WiFi or BlueTooth signal 228 or another form of wireless signal, as desired. Wireless signal 228 may allow multiple users to access the receiver apparatus 226 at the same time, allowing them to enjoy the satellite broadcasting services on personal electronic devices such as smartphones or tablet devices simply by installing an appropriate application on their smartphones or tablet devices or otherwise running an appropriate program. Also, the receiver apparatus 226 may have its own display and/or sound system for users to enjoy the broadcasting service without the personal electronic devices.

Figure 3:
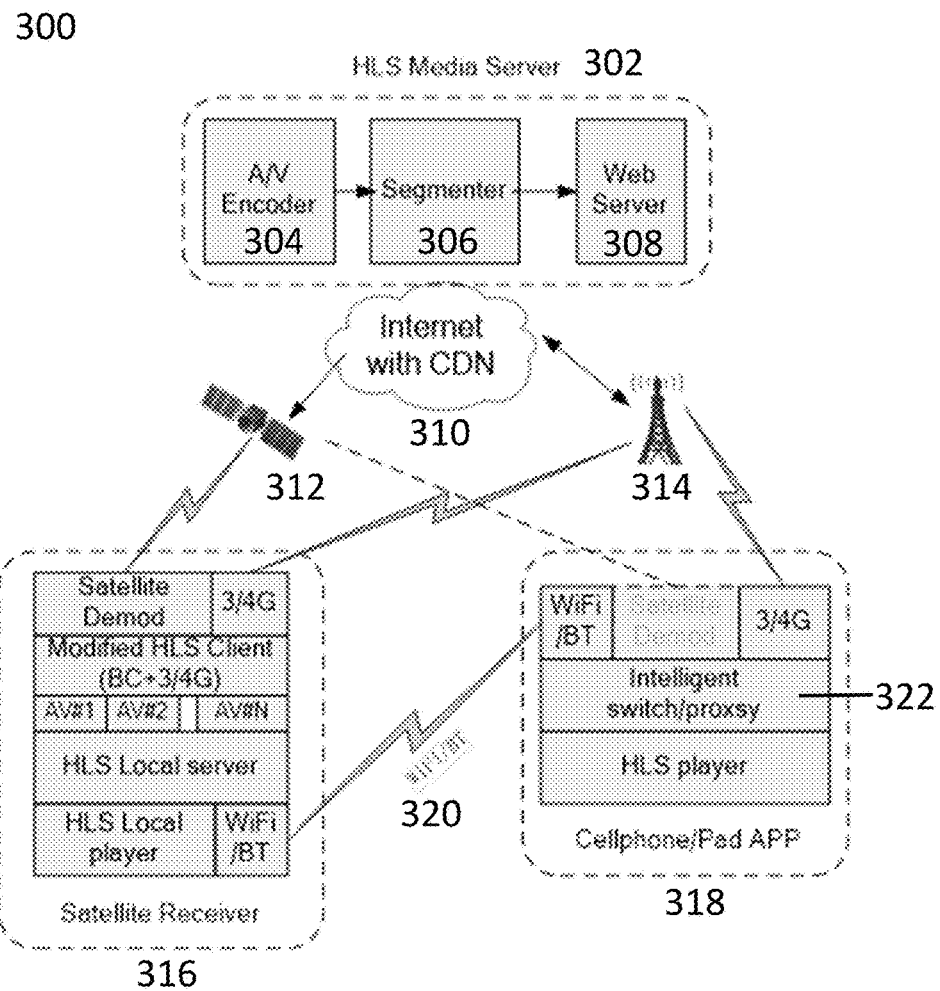
FIG. 3 is an exemplary embodiment showing an exemplary internal configuration of components for a system for collaborative broadcasting and bi-directional network transmission.

Turning now to exemplary FIG. 3, this figure displays an exemplary embodiment showing an exemplary internal configuration of components: a service platform 302; a satellite receiver 316; and a paired device 318 for a system for collaborative broadcasting and bi-directional network transmission 300. According to an exemplary embodiment, system 300 may use, for example, a service platform 302 such as a standard HLS (HTTP live streaming) media server. Service platform 302 may incorporate, for example, an A/V encoder 304, a segmenter 306, and a Web server 308. Service platform 302 may transmit program segments, such as HLS segments, via a satellite 312 for broadcasting and/or bi-directional network 314 for internet access, which may operate through an internet content distribution network 310 or independently, as desired.

According to an exemplary embodiment, satellite receiver 316 may be configured to act similarly to a modified HLS client. Specifically, satellite receiver 316 may be configured to attempt to receive and decode any applicable program segments from the satellite 312 first, for the reason that receiving broadcasted program segments from the satellite 312 consumes no internet traffic. According to an exemplary embodiment, satellite receiver 316 may be configured to request recovery data only when one or more the segments and/or bits are not received correctly, or when there is some other error with one or more of the segments and/or bits, as desired.

According to an exemplary embodiment, satellite receiver 316 may be configured to use these program segments to duplicate a local copy of the service platform 302 on the Internet. This may then support local playback from the satellite receiver 316 and/or access of any paired devices 318. Paired devices 318 may include any smartphones, tablet devices, or any other applicable hardware devices, as desired. Such devices 318 may be paired with the satellite receiver 316 via a near-area wireless connection 320, such as WiFi or BlueTooth, and may access the satellite service locally through this near-area wireless connection 320, or through a more physical connection, if desired. Alternatively, the satellite receiver 316 may be integrated into the paired device 318 as a component thereof. As such, the satellite receiver 316 may communicate with other components of the paired device 318, for example, via data bus. Paired devices 318 may, in addition to accessing the satellite receiver 316, may access the Internet through the bi-directional network 314.

According to an exemplary embodiment, the paired device 318 may access the satellite 312 directly. In order to access the satellite 312 directly, paired devices 318 may be retrofitted or modified by a hardware upgrade such as integrating a satellite module, or other upgrade method, as desired. According to such an exemplary embodiment, the paired device 318 may use a switching device, such as an intelligent switch or proxy 322. This can allow the paired device 318 to select between multiple methods of accessing any particular services that are requested, and select the best way of accessing any of these services. For example, according to an exemplary embodiment, the paired device 318 may select to access to the satellite service through either the near-area wireless connection 320 with the satellite receiver 316 or the direct connection with the satellite 312. For another example, according to an exemplary embodiment, the throughput of the satellite broadcast and the bi-directional network may be compared, and the connection with the faster data transfer rate may be used. Other factors, such as whether one connection has a limited data plan, may also be incorporated, as desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for collaborative broadcasting and bi-directional network transmission, the system comprising:
a broadcast transmission source that broadcasts a signal carrying program data in the form of a plurality of data segments using one-to-many broadcasting;
a bi-directional network that transmits and receives data using one-to-one transmission;
at least one receiver that receives the signal broadcasted from the broadcast transmission source, analyzes the signal to generate a feedback information, and transmits the feedback information to the bi-directional network if the receiver detects an erroneous signal;
wherein the bi-directional network receives the feedback information, and further transmits recovery data to the receiver; and
wherein the receiver recovers the erroneous signal using the recovery data, and
wherein the receiver communicates with a second receiver, and
the system further comprising at least one paired device communicatively coupled to the receiver, the at least one paired device comprising a switch,
wherein the broadcast transmission source comprises a satellite broadcasting service,
wherein the satellite broadcasting service transmits HTTP Live Streaming (HLS) segments to at least one satellite receiver which acts as a modified HLS client, and
wherein the at least one paired device and at least one of the receiver, the second receiver and the satellite receiver are in communication via a near-area connection.

2. The system of claim 1, wherein the receiver comprises:
a processor operationally linked to a memory, the processor stores the signal received from the broadcast transmission source in the memory, analyzes the signal to generate the feedback information, and recovers the erroneous signal using the recovery data from the bi-directional network; and
a transmitter operationally linked to the processor, the transmitter transmits the feedback information as instructed by the processor to the bi-directional network.

3. The system of claim 2, wherein the receiver further comprising an output for a user.

4. The system of claim 1, wherein the receiver chooses between the broadcast transmission source and the bi-directional network for a wireless connection.

5. The system of claim 1, wherein the paired device comprises a switching device for selecting to communicate with the receiver, the broadcast transmission source, or the bi-directional network.

6. The system of claim 1, wherein the broadcast transmission source and the bi-directional network are connected to a multimedia service platform.

7. The system of claim 6, wherein the multimedia service platform receives the feedback information via the bi-directional network, determines the recovery data using the feedback information, and transmits the recovery data to the receiver via the bi-directional network or the broadcast transmission source.

8. The system of claim 6, wherein the multimedia service platform comprises an A/V encoder, a segmenter, and a Web server.

9. The system of claim 6, wherein the multimedia service platform is an HTTP Live Streaming (HLS) media server.

10. The system of claim 1, wherein the bi-directional network comprises a cellular telephone service.

11. A method for collaborative broadcasting and bi-directional network transmission, the method comprising:
broadcasting, using a broadcast transmission source, program data HLS segments to at least one receiver; and
communicating, on a bi-directional network, feedback information from the receiver for informing a status of the broadcasting and a recovery data to the receiver for recovering an erroneous broadcasting, wherein the receiver communicates with a second receiver, and further comprising at least one paired device coupled to the at least one receiver, wherein the paired device includes a switch, wherein the broadcast transmission source comprises a satellite broadcasting service, wherein the satellite broadcasting service transmits HTTP Live Streaming (HLS) segments to at least one satellite receiver which acts as a modified HLS client, and wherein the at least one paired device and at least one of the receiver, the second receiver and the satellite receiver are in communication via a near-area connection.

12. The method of claim 11, further comprising connecting the receiver to at least one paired device via a near-area wireless connection.

13. A method for collaborative broadcasting and bi-directional network transmission, the method comprising:

determining, on a multimedia service platform, program data to be broadcasted;

segmenting, on the multimedia service platform, the program data into a plurality of HLS segments;

assigning, on the multimedia service platform, a sequence number identifier to each of the plurality of HLS segments;

broadcasting, using a broadcast transmission source, the plurality of HLS segments to at least one receiver;

analyzing, on the receiver, the HLS segment to generate a feedback information of erroneous HLS segments;

transmitting, using a bi-directional network, the feedback information to the multimedia service platform;

determining, on the multimedia service platform, a recovery data using the feedback information;

transmitting, using the bi-directional network, the recovery data to the receiver; and recovering, on the receiver, at least one erroneous HLS segment using the recovery data, wherein the receiver communicates with a second receiver, and pairing at least one device to the at least one receiver, wherein the at least one paired device includes a switch, wherein the broadcast transmission source comprises a satellite broadcasting service, wherein the satellite broadcasting service transmits HTTP Live Streaming (HLS) segments to at least one satellite receiver which acts as a modified HLS client, and wherein the at least one paired device and at least one of the receiver, the second receiver and the satellite receiver are in communication via a near-area connection.

14. The method of claim 13, further comprising selecting, on at least one paired device, to connect with the receiver, the broadcast transmission source, or the bi-directional network using a switching device.

* * * * *